US009363781B2

United States Patent
Won et al.

(10) Patent No.: US 9,363,781 B2
(45) Date of Patent: Jun. 7, 2016

(54) LOCATION REGISTRATION METHOD AND APPARATUS OF TERMINAL IN MOBILE COMMUNICATION SYSTEM

(71) Applicant: Samsung Electronics Co., Ltd., Suwon-si, Gyeonggi-do (KR)

(72) Inventors: Sung Hwan Won, Suwon-si (KR); Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/242,166

(22) Filed: Apr. 1, 2014

(65) Prior Publication Data

US 2014/0295838 A1   Oct. 2, 2014

(30) Foreign Application Priority Data

Apr. 1, 2013 (KR) .................. 10-2013-0035172
Apr. 9, 2013 (KR) .................. 10-2013-0038798
Jun. 19, 2013 (KR) .................. 10-2013-0070581

(51) Int. Cl.
*H04W 60/04* (2009.01)
*H04W 60/00* (2009.01)
*H04W 36/32* (2009.01)

(52) U.S. Cl.
CPC .............. *H04W 60/04* (2013.01); *H04W 36/32* (2013.01); *H04W 60/00* (2013.01)

(58) Field of Classification Search
CPC ...... H04W 60/04; H04W 60/00; H04W 36/32
See application file for complete search history.

(56) References Cited

U.S. PATENT DOCUMENTS

| 6,510,318 | B1 | 1/2003 | Minagawa | |
|---|---|---|---|---|
| 2001/0034232 | A1 | 10/2001 | Kuwahara | |
| 2003/0013444 | A1 | 1/2003 | Watanabe et al. | |
| 2011/0124341 | A1 | 5/2011 | Kubo et al. | |
| 2013/0005335 | A1 | 1/2013 | Cheng | |
| 2014/0153423 | A1* | 6/2014 | Shin | H04W 36/18 370/252 |
| 2014/0185467 | A1* | 7/2014 | Heo | H04W 52/54 370/252 |
| 2014/0269575 | A1* | 9/2014 | Zhang | H04L 5/0032 370/329 |
| 2014/0335869 | A1* | 11/2014 | Choi | H04W 36/0072 455/438 |
| 2015/0003418 | A1* | 1/2015 | Rosa | H04W 74/0833 370/331 |
| 2015/0092750 | A1* | 4/2015 | Huang | H04W 36/08 370/331 |
| 2015/0146665 | A1* | 5/2015 | Zhang | H04W 56/0045 370/329 |
| 2015/0195865 | A1* | 7/2015 | Lee | H04W 36/0061 455/426.1 |
| 2015/0223220 | A1* | 8/2015 | Zhao | H04L 1/1812 455/450 |
| 2015/0244429 | A1* | 8/2015 | Zhang | H04B 7/024 370/329 |

FOREIGN PATENT DOCUMENTS

EP     2 346 286 A1     7/2011

* cited by examiner

*Primary Examiner* — Nathan Mitchell
(74) *Attorney, Agent, or Firm* — Jefferson IP Law, LLP

(57) ABSTRACT

A location registration method of a terminal in a mobile communication system is provided. The method transmitting a location registration request message to a network, waiting, when a reject message is received from the network in response to the location registration request message, until a radio connection with the network releases completely, and transmitting, when the radio connection is released, a new location registration request message to the network.

16 Claims, 9 Drawing Sheets

LOCATION REGISTRATION METHOD AND APPARATUS OF TERMINAL IN MOBILE COMMUNICATION SYSTEM

CROSS-REFERENCE TO RELATED APPLICATION(S)

This application claims the benefit under 35 U.S.C. §119(a) of a Korean patent application filed on Apr. 1, 2013 in the Korean Intellectual Property Office and assigned Serial number 10-2013-0035172, a Korean patent application filed on Apr. 9, 2013 in the Korean Intellectual Property Office and assigned Serial number 10-2013-0038798, and a Korean patent application filed on Jun. 19, 2013 in the Korean Intellectual Property Office and assigned Serial number 10-2013-0070581, the entire disclosure of each of which is hereby incorporated by reference.

TECHNICAL FIELD

The present disclosure relates to a location registration method and apparatus of a terminal in a mobile communication network. More particularly, the present disclosure relates to a method and apparatus of using radio resource efficiently in handover, location registration, and radio connection reestablishment procedures from the view point of time reduction and resource-saving.

BACKGROUND

Mobile communication systems were developed to provide the subscribers with voice communication services on the move. With the rapid advance of technologies, the mobile communication systems have evolved to support high speed data communication services beyond the early voice-oriented services.

FIG. 1 is a diagram illustrating a general mobile communication system according to the related art.

Referring to FIG. 1, the mobile communication system includes a User Equipment (UE) 100, a Radio Access Network (RAN) 120, and a core network 140.

The RAN 120 may include radio access points 110 and 115. The radio access points 110 and 115 may interact with the UE 100 through a radio interface. Other entities of the mobile communication system are primarily connected through wire links. Examples of the radio access points 110 and 115 include evolved Node B (eNB), Node B (NB) or a Radio Network Subsystem (RNS) including Node Bs, Base Transceiver Station (BTS) or Base Station Subsystem (BSS) including BTSs, and wireless access points. With some exceptions, each of the radio access points 110 and 115 is comprised of at least one cell having a predetermined area, and the UE 100 is served by the corresponding radio access point within the cell area. The cell denotes the cell of the general cellular system, and the radio access points 110 and 115 are the device of managing and controlling the respective cell but, in the present disclosure, the terms 'cell' and 'radio access point' are used interchangeably in the same meaning.

The core network 140 may include a RAN control entity 130. The RAN control entity 130 is responsible for overall control of mobility management and authentication and security. Examples of RAN control entity may include Mobility Management Entity (MME), Serving General Packet Radio Service (SGSN), etc.

In order to provide the UE 100 with a service, the mobile communication system including the radio access point 110 has to maintain the connection with the UE 100 or have the context concerning the UE 100. The mobile communication system performs handover procedure, location registration procedures, or radio connection reestablishment procedure to maintain the connection with the UE 100 or locate the context of the UE 100 at the right place.

The handover procedure is performed according to the movement of the UE 100 in the connected state or for other reasons to changes the radio access point for interaction. Examples of the other reasons may include load balancing.

The location registration procedure includes an Attach procedure and Tracking Area Update (TAU) procedure. The Attach procedure is performed when the UE 100 connects to the network or the detached UE 100 reconnects to the network. The TAU procedure may be performed in more various situations, representatively, when the UE enters a new Tracking Area (TA).

In addition to the handover procedure and location registration procedure caused by the UE mobility, those may occurs when the wireless connection between the UE 100 and the radio access point 110 is unstable so as to be inappropriate for use for a certain duration. In such a case, it is possible to perform the radio connection reestablishment procedure between the UE 100 and the radio access point 110 before or without handover procedure and location registration procedure.

Accordingly, a method and apparatus of using the radio resource efficiently in view of time reduction or resource-saving by improving the handover procedure, location registration procedure, and radio connection reestablishment procedure of the User Equipment (UE) is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus of using the radio resource efficiently in view of time reduction or resource-saving by improving the handover procedure, location registration procedure, and radio connection reestablishment procedure of the User Equipment (UE).

In accordance with an aspect of the present disclosure, a location registration method of a terminal in a mobile communication system is provided. The location registration method includes transmitting a location registration request message to a network, waiting, when a reject message is received from the network in response to the location registration request message, until a radio connection with the network releases completely, and transmitting, when the radio connection is released, a new location registration request message to the network.

In accordance with another aspect of the present disclosure, a location registration method of a terminal in a mobile communication system is provided. The location registration method includes transmitting a location registration message from a network and transmitting, when a reject message is received from the network in response to the location registration request, a new location registration request message to the network immediately.

In accordance with another aspect of the present disclosure, a location registration control method of a base station in a mobile communication system is provided. The location registration control method includes receiving a connection release command message from a core network in response to a location request of a terminal and transmitting, upon receipt of the connection release command message, a connection release message to the terminal.

In accordance with another aspect of the present disclosure, a location registration control method of the base station in a mobile communication system is provided. The location registration control method includes receiving a connection release command message from a core network in response to a location request of a terminal and waiting until a new location registration request message for the network is received from the terminal.

In accordance with another aspect of the present disclosure, a terminal executing location registration in a mobile communication system is provided. The terminal includes a transceiver configured to transmit and receive signals and data to and from a network and a controller configured to transmit a location registration request message to a network, to wait, when a reject message is received from the network in response to the location registration request message, until a radio connection with the network releases completely, and to transmit, when the radio connection is released, a new location registration request message to the network.

In accordance with another aspect of the present disclosure, a terminal executing location registration in a mobile communication system is provided. The terminal includes a transceiver configured to transmit and receive signals and data to and from a network and a controller configured to transmit a location registration message from a network and to transmit, when a reject message is received from the network in response to the location registration request, a new location registration request message to the network immediately.

In accordance with another aspect of the present disclosure, a base station controlling location registration of a terminal in a mobile communication system is provided. The base station includes a transceiver configured to transmit and receive signals and data to and from the terminal and a core network and a controller configured to receive a connection release command message from a core network in response to a location request of a terminal and transmitting, upon receipt of the connection release command message, a connection release message to the terminal.

In accordance with still another aspect of the present disclosure, a base station controlling location registration of a terminal in a mobile communication system is provided. The base station includes a transceiver configured to transmit and receive signals and data to and from the terminal and a core network and a controller configured to receive a connection release command message from a core network in response to a location request of a terminal and to wait until a new location registration request message for the network is received from the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
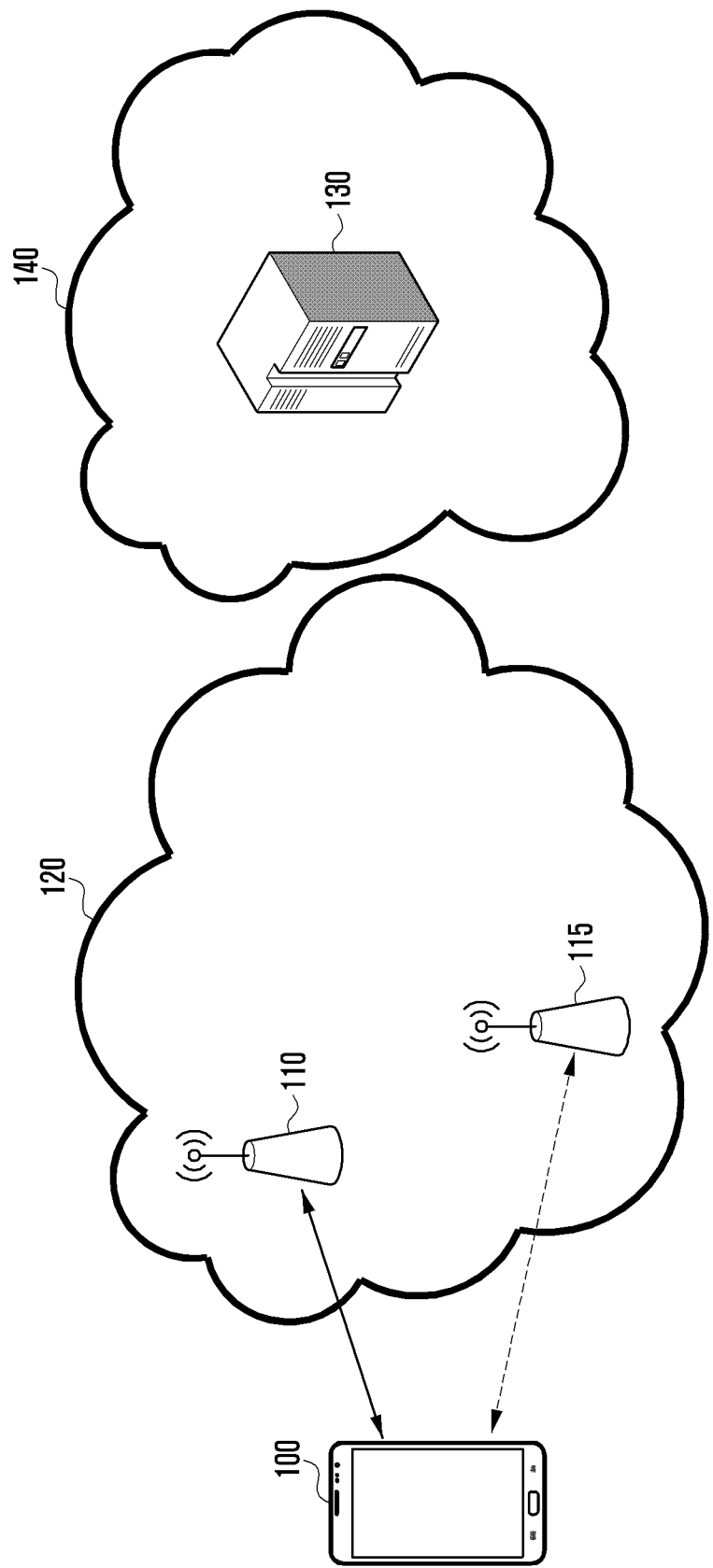
FIG. 1 is a diagram illustrating a general mobile communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the various embodiments of the present disclosure are directed to the Radio Access Network (RAN) abiding by a 3rd Generation Partnership Project (3GPP) standard Long Term Evolution (LTE) as a core network and Evolved Packet Core (EPC), the subject matter of the present disclosure may be applied to other types of communication system having a similar technical background with slight operation without departing from the scope of the present disclosure, and this will be understood by those in the art of the present disclosure.

Unlike the conventional system in which the User Equipment (UE) 100 interacts with one radio access point 110, the recent system allows the UE 100 to interact with one or more radio access points 110 and 115. As described above, FIG. 1 shows two radio access points 110 and 115 connected to the UE 100. However, the present disclosure is not limited to the embodiment of FIG. 1, and it is obvious that the UE 100 does not always interact with the two radio access points 110 and 115.

Unless otherwise stated throughout the specification, if one access point 110 is mentioned, this indicates a general radio access point; and if two radio access points 110 and 115 are mentioned together, this indicates that the first radio access point is the radio access point 110 with which the UE 100 interacts primarily and the second radio access point is the radio access point 115 with which the UE 100 interacts secondarily. If the number of radio access points to which the UE 100 is connected is 3 or more, the number of radio access points interacting with the UE 100 secondarily may be one or more.

In the above-described network structure, the following problems may occur. One problem is that it takes long time for the UE 100 which has failed location registration for a certain reason to attempt location registration again with the corresponding radio access point 110, and another problem is that the connection state with the radio access point 115 with which the UE interacts secondarily is not considered when the connection state with the radio access point 110 which the UE interacts primarily is degraded so as to result in resource waste. The problematic situations are described in more detail.

Figure 2:
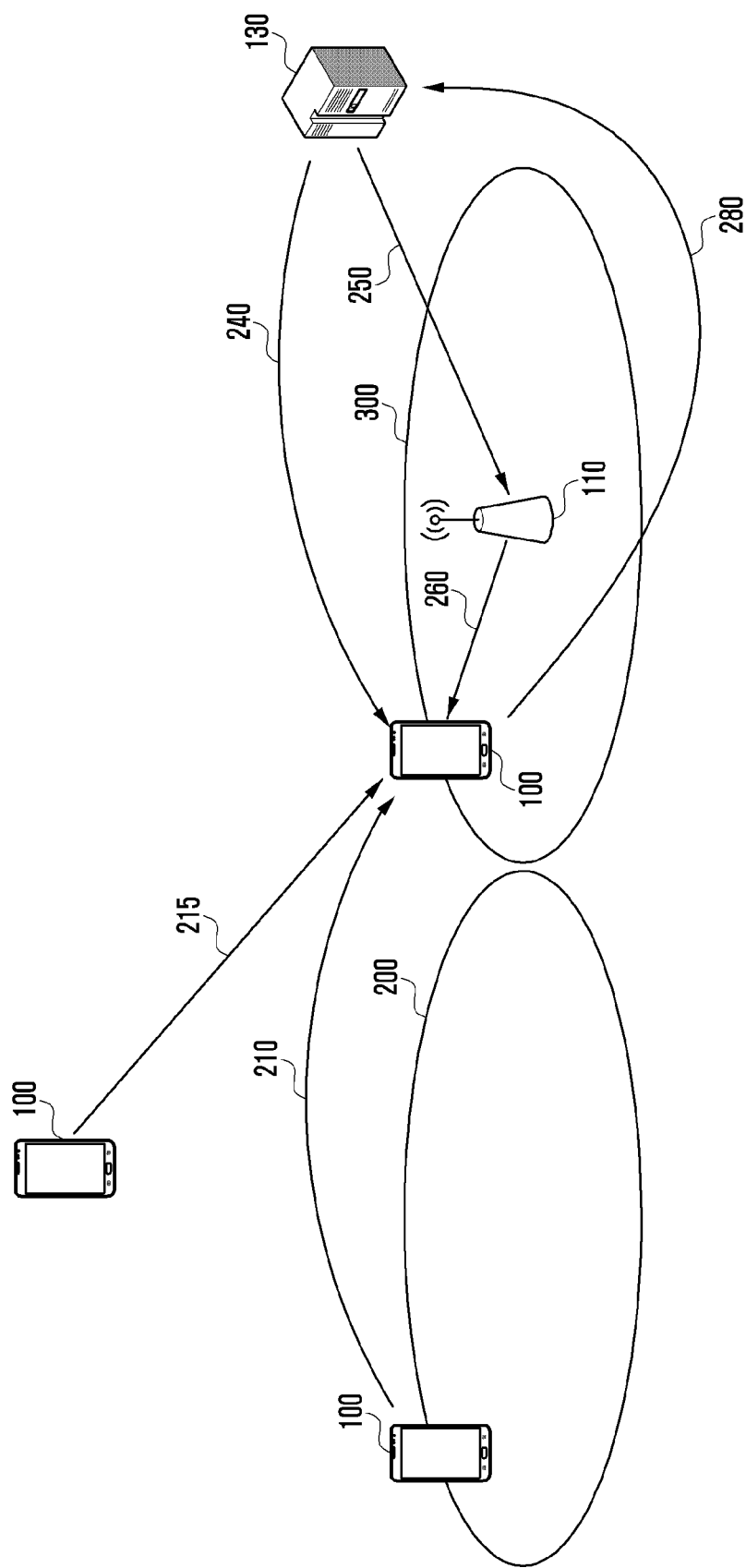
FIG. 2 is a diagram illustrating a situation causing the first problem according to an embodiment of the present disclosure.

FIG. 2 is a diagram illustrating a situation causing the first problem according to an embodiment of the present disclosure.

Referring to FIG. 2, a UE 100 may be registered with and/or receiving a service from the mobile communication system operating with different Radio Access Technology (RAT) and/or different RAN control entity group having different RAN control entity group identifier. The UE may be in the idle state.

If the UE 100 has moved from another RAT or another RAN control entity group as denoted by reference number 210, for example, from area 200 to area 300, the UE 100 transmits to the RAN control entity 130 the Tracking Area Update (TAU) request message. Or, if any data to transmit and/or receive to and from the network occurs at the UE 100 as denoted by reference number 215, the UE transmits to the RAN control entity 130 a service request message. The message transmitted from the UE 100 to the RAN control entity 130 is relayed by the radio access point 110.

If a problem occurs in receiving the TAU request message or Service request message from the UE 100, the RAN control entity 130 may transmit to the UE 100 a message rejecting the request message of the UE 100, i.e. TAU reject message or Service reject message. The RAN control entity 130 may include the information describing and/or alluding to the cause of the problem in the reject message. The reject message is transmitted 250 from the RAN control entity 130 to the UE 100 via the radio access point 110.

If the reject message is received from the RAN control entity 130 as denoted by reference number 240, the UE 100 may transmits a new Attach request message including the cause carried in the reject message to the RAN control entity 130 as denoted by reference number 280. Examples of the cause may include the case where the RAN control entity 130 fails acquiring the identifier of the UE 100, the case where the UE 100 is detached implicitly, and the case where the bearer information is not activated at all. These three causes match the cause values 9, 10, and 40 respectively in the Evolved Packet System (EPS).

After transmitting the reject message to the UE 100, the RAN control entity 130 may command the radio access point 110 to release the context concerning the UE 100 as denoted by reference number 240. This command may be transferred using a UE CONTEXT RELEASE COMMAND message.

If the release command is received from the RAN control entity 130, the radio access point 110 may transmit to the UE 100 a message requesting for connection release. Examples of the connection release message transmitted from the radio access point 110 to the UE 100 include an RRCConnectionRelease message.

If the time when the release message transmitted from the radio access point 110 to the UE 100 has arrived and thus the radio connection to the network is released completely as denoted by reference number 260 is earlier than the time when the UE 100 transmits a new Attach request message to the RAN control entity 130 as denoted by reference number 280, the UE 100 may perform the Attach procedure without an problem.

Otherwise if the time when the release message transmitted from the radio access point 110 to the UE 100 has arrived and thus the radio connection to the network is released completely as denoted by reference number 260, is later than the time when the UE 100 transmits a new Attach request message to the RAN control entity 130 as denoted by reference number 280, a problem may occur. That is, this situation denotes that the UE 100 transmits the Attach request message to the RAN control entity 130 and then the radio connection is released. Accordingly, the UE 100 regards this as a problematic situation in the Attach procedure and waits for a relatively long time (e.g. 10 seconds) to attempt location registration again. While waiting a long time, the UE 100 cannot receive the service and thus the user suffers an inconvenience.

A description is made of an embodiment of the present disclosure to solve the problem described with reference to FIG. 2. However, the problem to be solved is not limited to the situation as shown in FIG. 2 but include all situations increasing the time required for the UE which has failed location registration for a certain reason to perform location registration again with the corresponding radio access point obviously.

In order to solve the above problem, the present disclosure is described in connection with two various embodiments. However, it is obvious to those skilled in the art that the all available modifications may be made to the various embodiments to be described hereinafter to accomplish the technical concept of the present disclosure.

Referring to FIG. 2, an embodiment of the present disclosure is of making the arrival time of the release message transmitted from the radio access point to the UE 100 as denoted by reference number 260 to precede the time when the UE 100 transmits to the RAN control entity 130 the new Attach request message as denoted by reference number 280.

Another embodiment of the present disclosure is of preventing the connection between the UE 100 and the radio access point 110 from being released, i.e. negating the operation as denoted by reference number 260 in FIG. 2. According to this embodiment, the release message is not transmitted from the radio access point 110 to the UE 100.

The difference between the above two various embodiments is whether the radio connection is reused or not. That is, the former embodiment is characterized by releasing the connection between the UE 100 and the radio access point 110 at any cost and requesting, at the UE 100, for new location registration. The latter embodiment is characterized by reusing the radio connection established previously without release between the UE 100 and the radio access point 110, so as to request a new location registration.

Both of these two various embodiments are capable of preventing the time when the radio connection is released due to the arrival of the release message transmitted from the radio access point 110 to the UE 100 from following the time when the UE 100 transmits the new location registration request to the RAN control entity 130, thereby preventing the UE from waiting for a long time to request the location registration again, resulting in reduction in delay time.

Figure 3:
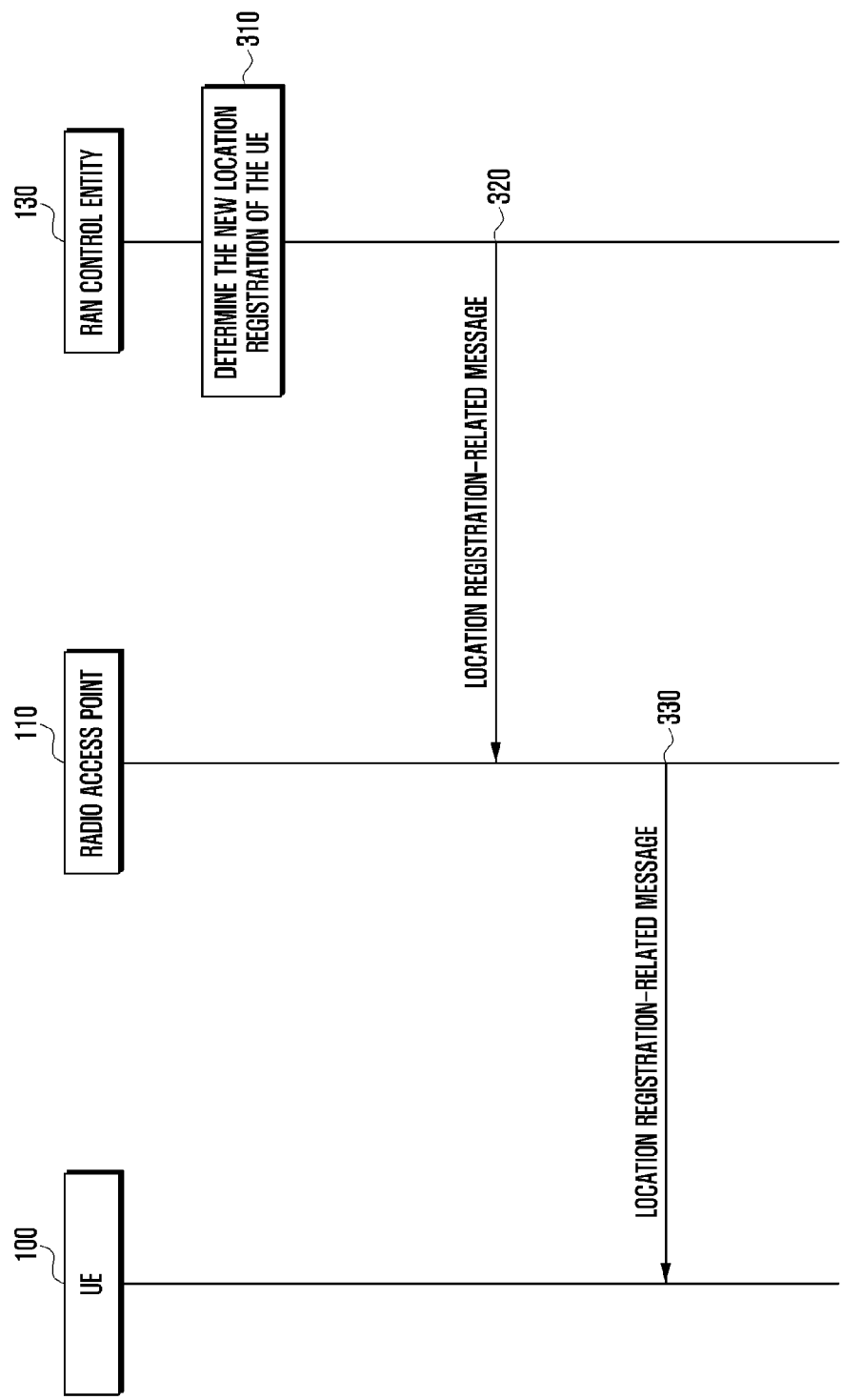
FIG. 3 is a signal flow diagram illustrating signal flows between a User Equipment (UE) and a network according to an embodiment of the present disclosure.

FIG. 3 is a signal flow diagram illustrating signal flows between a UE and a network according to an embodiment of the present disclosure and, in more detail, shows the operation in which a RAN control entity transmits to a radio access point one of an indicator indicating necessity of new location registration of a terminal and a timer or the RAN control entity or the radio access point transmits to the UE the timer.

Referring to FIG. 3, a UE 100 and a radio access point 110 may be aware of the situation where new location registration procedure is required. The UE 100 or the radio access point 110 may transmit the message triggering the new location registration procedure or radio connection release procedure based on the timer.

ARAN control entity 130 may determine the necessity of the new location registration of the UE 100 in certain problematic situations at operation 310. As described above, the problematic situation may be the situation corresponding at least one of the cause values 9, 10, and 40 used in EPS. The determination made by the RAN control entity 130 at operation 310 mad be of location registration or service request of the UE 100.

The RAN control entity 130 may transmit to the radio access point 110 at least one of the timer and the indicator notifying of the necessity of the new location registration of the UE 100. The information transmitted from the RAN control entity 130 to the radio access point 110 may be carried in the DOWNLINK NAS TRANSPORT message. The DOWNLINK NAS TRANSPORT message is used for transporting Non-Access Stratum (NAS) message between the UE 100 and the RAN control entity 130. Examples of the NAS message carried in the in the DOWNLINK NAS TRANSPORT message include TAU reject and Service reject. The information transmitted from the RAN control entity 130 to the radio access point 110 may be transmitted using the UE CONTEXT RELEASE COMMAND message for commanding the UE 100 to release the connection.

The indicator notifying of the necessity of new location registration of the UE 100 may be expressed in various ways. For example, the indicator may be expressed with simple binary information or the reason for the UE's new location registration necessity situation or the cause value.

The radio access point 110 may transmit to the UE the timer at operation 330. The timer may be included in the DLInformationTransfer message or the NAS message carried in the DLInformationTransfer message.

The timer transmitted from the RAN control entity 130 to the radio access point 110 at operation 320 and the timer transmitted from the radio access point 110 to the UE 100 may be set to the same value or different values.

Hereinafter, a description is made of the operations of the RAN control entity 130 and the radio access point 110 in case that the radio access point 110 receives an indicator notifying of the necessity of new location registration of the UE 100 from the RAN control entity 130 and a timer of fails receiving both the indicator and timer according to an embodiment of the present disclosure in the situation as shown in FIG. 3.

In the case that the radio access point 110 has received neither the indicator nor the timer from the RAN control entity 130, it is necessary for the UE 100 to release the radio connection immediately as far as possible before requesting for the new location registration in the network.

Accordingly, it is detected that the new location registration of the UE 100 is required, the RAN control entity 130 transmits to the radio access point 110 a UE CONTEXT RELEASE COMMAND message immediately as far as possible. For example, right after the transmission of the NAS message notifying of the location registration reject to the UE 100, it is possible to transmit to the radio access point 110 the UE CONTEXT RELEASE COMMAND message. Also, upon receipt of the UE RELEASE COMMAND message from the RAN control entity 130, the radio access point 110 may release the radio connection of the UE 100. For example, upon receipt of the UE CONTEX TELEASE COMMAND message from the RAN control entity 130, the radio access point 110 may transmit to the UE 100 the UE CONTEXT RELEASE RRCConnectionRelease message. Also, upon receipt of the connection release message from the radio access point 110, the UE 100 may release the radio connection.

In the case where the radio access point 110 receives the indicator but not the timer from the RAN control entity 130, the radio access point 110 is aware of the situation that the UE 100 is requesting for new location registration. Accordingly, the radio access point 110 is capable of releasing the radio communication of the UE 100 immediately after recognizing the situation requiring new location registration using the indicator regardless of the UE CONTEXT RELEASE COMMAND message transmission of the control entity 130.

For example, if the indicator is received through the UE CONTEXT RELEASE COMMAND message, the radio access point 110 transmits to the UE 100 the RRCConnectionRelease message immediately and, if the indicator is received through another type of message, may transmit to the UE 100 the RRCConnectionRelease message immediately even before receipt of the UE CONTEXT RELEASE COMMAND message.

If the timer is received from the RAN control entity 130, the radio access point 110 is capable of releasing the radio communication of the UE 100 in the time indicated or represented by the timer starting at an appropriate time. The timer is responsible for the function of agreement. For example, the UE 100 does not request for the location registration to the RAN control entity 130 in the time indicated or represented by the timer received from the radio access point 110. Examples of the time appropriate for starting the timer include the time when the radio access point 110 receives the timer.

Next, a description is made of the procedure in which the UE 100 reuses the radio connection to request for new location registration according to another embodiment of the present disclosure in the situation as depicted in FIG. 3.

If both the new location registration necessity indicator and timer for the UE 100 are not received at operation 320, it is necessary for the radio access point 110 to maintain the radio connection for a predetermined duration in order for the UE 100 to perform the new location registration reusing the radio connection present already. The predetermined duration may be determined by a unique timer of the radio access point 110.

Accordingly, if it is recognized that the new location registration of the UE 100 is required at operation 310, the RAN control entity 130 may not transmit to the radio access point 110 the UE CONTEXT RELEASE COMMAND message at operation 320. Although the UE CONTEXT RELEASE COMMAND message is received from the RAN control entity 130, the radio access point 110 may wait for a predetermined time without releasing the radio connection of the UE 100.

If the UE requests the radio access point 110 for new location registration in waiting for the predetermined time, the radio access point 110 may ignore the UE CONTEXT RELEASE COMMAND message received from the RAN control entity 130 so as to do not release the radio connection of the 100.

In the case of receiving only the indicator but not the timer from the RAN control entity 130, the radio access point 110 determines that the UE 100 is requesting for new location registration. Accordingly, if it is determined that new location registration of the UE is required based on the indicator independently of the UE CONTEXT RELEASE COMMAND message transmitted by the RAN control entity 130, the radio access point 110 waits for receiving a new location registration request from the UE 100 without releasing its radio connection. The wait time of the radio access point 110 may be maintained before the timeout of the unique timer of the radio access point 110.

In the case that the timer is received from the RAN control entity 130, the radio access point 110 maintains the radio connection of the UE 100 for the time duration or represented by the timer from a certain time point. The timer may be regarded as a function of an agreement. For example, the UE 100 transmits a new location registration request in the time indicated or represented by the received timer. Examples of the time appropriate for starting the timer include the time when the radio access point 110 receives the timer.

Hereinafter, descriptions are made of the operations of the UE 100 according to the various embodiments of the present disclosure in the situation of FIG. 3 in detail.

According to an embodiment of the present disclosure, if the timer (related to location registration) is not received from the network at operation 330 of FIG. 3, the UE 100 may wait until the radio connection and/or NAS(Non Access Stratum) signaling is/are released by the radio access point 110 and, if the radio connection is released, request for new location registration The UE 100 also may request a new location registration using an alternative method of the above described method. That is, if the predetermined duration of waiting for release of the radio connection elapses and/or NAS(Non Access Stratum) signaling, the UE 100 releases the radio connection and/or NAS(Non Access Stratum) signaling with the radio access point 110 and establishes a new request for location registration. The predetermined duration indicates appointed time duration obviously. For example, the predetermined duration may be a value of timer (i.e. 10 sec) of T3440 timer of UE 100.

If the timer is received at operation 330, the UE 100 may request for new location registration after the elapse of the time indicated or represented by the timer at least. If the radio connection is released before the expiry of the timer, the UE stops the timer and requests a new location registration.

The terminal 100 is capable of being aware of the necessity of new location registration based on the message received from the network, e.g. location registration rejection message and thus it is efficient to release the radio connection immediately as far as possible in view of time reduction. Accordingly, upon receipt of the message instructing radio connection release from the radio access point 110, the UE 100 may get out of the connected state without delay. The information letting the UE be aware of the situation requiring new location registration procedure may be the information received on the NAS layer. In order for the UE 100 to get out of the connected state without delay, the NAS layer transmits the information to the RRC layer.

The current UE 100 is designed to delay the radio connection release procedure for the duration of 60 ms when a radio connection release message is received from the radio access point 110 in a specific situation. Accordingly, in an embodiment of the present disclosure, if the UE 100 gets out of the connected state 'without delay', this means that the UE gets out of the connected state 'in 60 ms since the receipt of the message' or 'without waiting of 60 ms.'

According to another embodiment of the present disclosure, if the timer is not received at operation 330 of FIG. 3, the UE 100 may transmit the new location registration request to the RAN control entity 130 immediately after operation 330. If the timer is received at operation 330, the UE 100 may transmit the new location registration request to the RAN control entity 130 in the time duration indicated or represented by the timer.

Whether the UE reuses the radio connection for new location registration may be determined depending on the situation in another embodiment.

According to an embodiment of the present disclosure, the RAN control entity 130 may start the timer when the new location registration of the UE 100 is required at operation 310 of FIG. 3. The timer may be identical with or different from the timer transmitted from the RAN control entity 130 to the radio access point 110. The timer of the RAN control entity 130 may start after or at the time when at least one of the indicator and timer is transmitted to the radio access point 110 through the location registration message at operation 320.

If the UE transmits to the RAN control entity 130 a new location registration request before the expiry of the timer, the RAN control entity 130 may perform location registration of the UE 100 without release of the radio connection by transmitting the UE CONTEXT RELEASE COMMAND message to the radio access point 110. That is, the location registration is performed with the reuse of the radio connection. If the UE 100 attempts location registration before the expiry of the timer in this way, the RAN control entity 130 stops or terminates the timer upon receipt of the location registration request message.

Otherwise, if the UE 100 does not transmit the new location registration request before the expiry of the timer, the RAN control entity 130 triggers radio connection release. The radio connection release may be triggered by transmitting the UE CONTEXT RELEASE COMMAND message to the radio access point 110.

Figure 4:
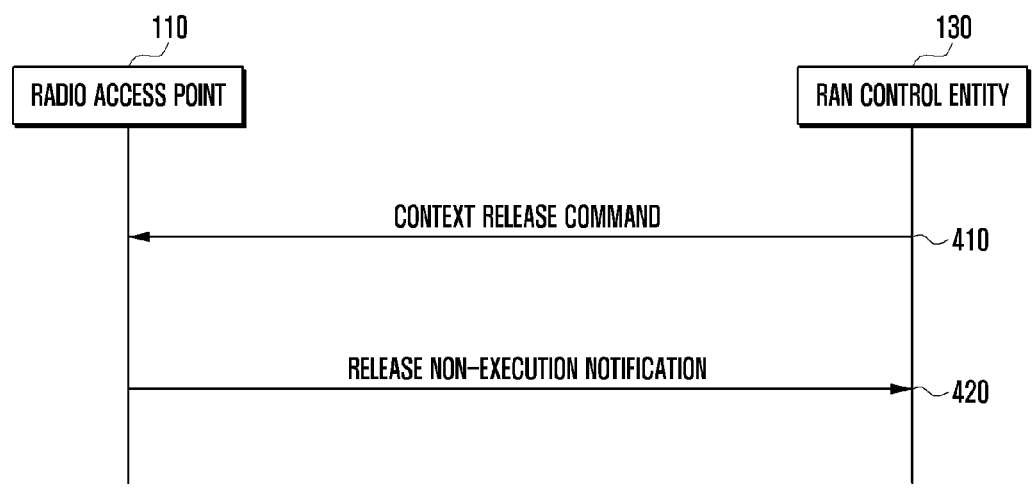
FIG. 4 is a signal flow diagram illustrating signal flows between a RAN control and a radio access point according to an embodiment of the present disclosure.

FIG. 4 is a signal flow diagram illustrating signal flows between a RAN control entity and a radio access point according to an embodiment of the present disclosure.

As described above, according to another embodiment of the present disclosure, a radio access point 110 may not release the UE context or radio connection even when a RAN control entity 130 commands the context release by transmitting the UE CONTEXT RELEASE COMMAND message to the radio access point 110. Accordingly, the rand access point 110 may notify the RAN control entity 130 that the UE context or the radio connection is not released. If the UE 100 has requested the new location registration by reusing the radio connection established already, it may be necessary for the radio access point 110 to maintain the radio connection for a predetermine duration even when the context release or radio connection release message is received from the RAN control entity 130 as described above.

Referring to FIG. 4, the RAN control entity 130 may transmit to the radio access point 110 a message commanding context release of the UE 100 at operation 410. Examples of the message transmitted at operation 410 may include UE CONTEXT RELEASE COMMAND message. After the message is received from the RAN control entity 130, the radio access point 110 may not perform context release or radio connection release despite of the command from the RAN control entity.

At operation 420, the radio access point 110 may notify the RAN control entity 130 that the UE context or the radio connection has not been released by transmitting a notification message. Examples of the message transmitted at operation 420 may include the UE CONTEXT RELEASE COMPLETE message and the ERROR INDICATION message. The message transmitted from the radio access point 110 to the RAN control entity 130 may include the Information Element (IE) notifying that the UE context or the radio connection has not been released. Examples of the IE that maybe carried in the message include a cause value and an indicator.

The message transmitted from the radio access point 110 to the RAN control entity 130 may be a new type of message. In the case that the IE notifying of the non-execution of the UE-related release is carried in a new type of message, the new message may be referred to as UE CONTEXT RELEASE FAILURE message in an embodiment.

In the conventional method, if the RAN control entity 130 commands the radio access point 110 to release the context, the radio access point 110 has to execute the command. In the above-described embodiment of the present disclosure, however, the radio access point 110 may not release the context or the radio connection in a specific situation.

In the case of applying the procedure of FIG. 4 to another embodiment, the RAN control entity 130 transmits the context release command at operation 410 when the new location registration request is not received from the radio access point 110 before the expiry of the radio access point 110's timer. Although the context release command is transmitted to the radio access point 110 due to the expiry of the timer of the RAN control entity 130, the radio access point 110 may transmit the message notifying of the non-execution of the context release before the expiry of its own timer at operation 420.

Figure 5:
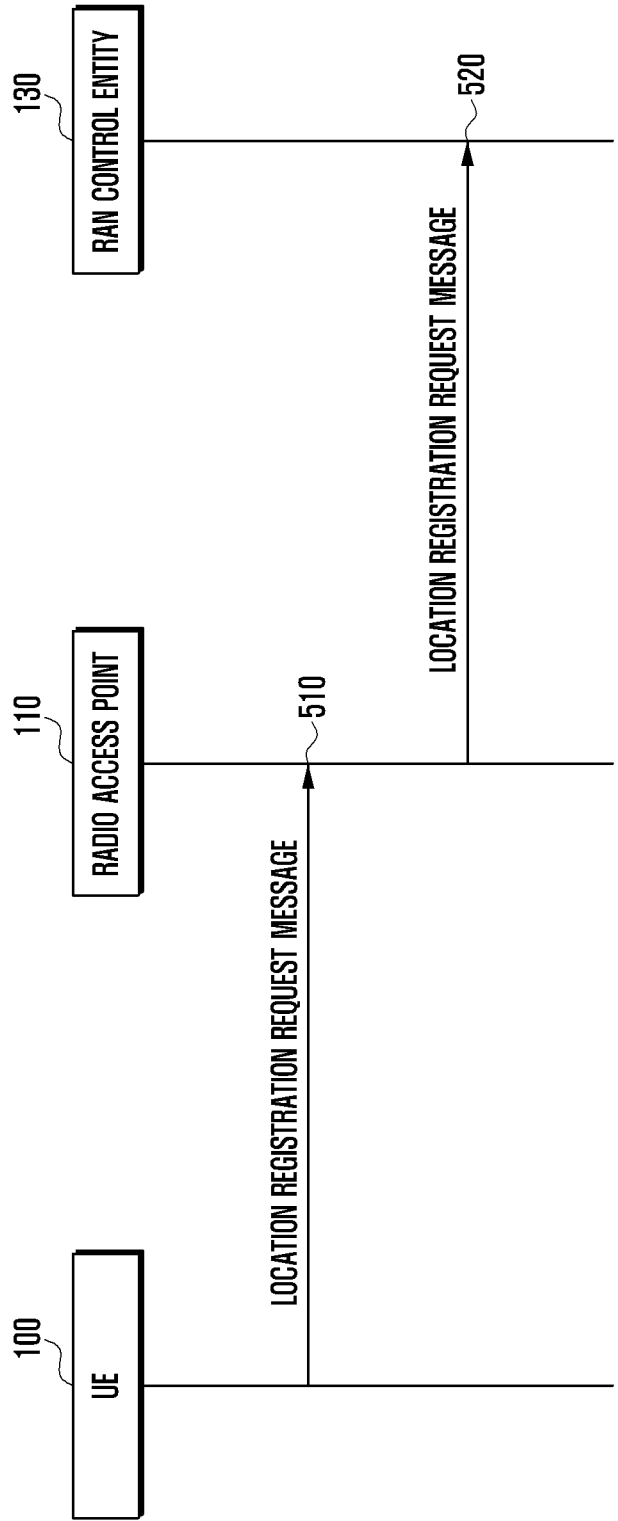
FIG. 5 is a signal flow diagram illustrating a procedure of relaying, at a radio access point, a location registration message of a UE reusing a radio resource according to an embodiment of the present disclosure.

FIG. 5 is a signal flow diagram illustrating a procedure of relaying, at a radio access point, the location registration message of a UE reusing a radio resource according to an embodiment of the present disclosure.

Referring to FIG. 5, a radio access point 110 is capable of relaying the location registration request message to a RAN control entity 130 successfully even when a UE 100 transmits the message by reusing the radio resource.

Referring to FIG. 5, the UE 100 transmits to the radio access point 110 the location registration request message at operation 510. The message transmitted by the UE may be the NAS message addressed to the RAN control entity 130 and may be carried in the ULInformationTransfer message. In the case that the UE 100 requests a new location registration by reusing the radio connection according to an embodiment of the present disclosure, the UE may include specific information in the location registration request message. The specific information included in the message may be of notifying that the UE requests a location registration newly by reusing the radio connection.

The radio access point 110 may transmit the location registration request message of the UE 100 to the RAN control entity 130 at operation 520. One of the INITIAL UE message and the UPLINK NAS TRANSPORT message may be used for transmission of the message of the UE 100.

The conventional location registration request message is primarily carried by the INITIAL UE message. The INITIAL UE message includes an IE defined for transmission of the location registration message unlike the UPLINK NAS TRANSPORT message and DOWNLINK NAS TRANSPORT message carrying general NAS messages. The INITIAL UE message is restricted so as only to carrying the NAS message transmitted first since the establishment of the radio connection.

However, it may be necessary to transmit the location registration request message in a certain case other than the NAS message transmitted first since the radio connection establishment. Accordingly, it is required to modify the procedure such that the INITIAL UE message maybe transmitted in a situation other than the situation where the NAS message is transmitted first since the establishment of the radio connection of the UE 100. Examples of such a situation may include the situation where the UE transmits the ULInformationTransfer message including specific information and the situation where the RAN control entity 130 notifies that the UE requests a location registration newly.

In the case that the message relayed by the radio access point 110 is the UPLINK NAS TRANSMPORT message, the radio access point 110 may include at least one of the IEs that are included in the INITIAL UE message, e.g. RRC Establishment Cause, S-TMSI, CSG Id, GUMMEI, Cell Access Mode, Relay Node Indicator, GUMMEI Type, and Tunnel Information for BBF in the UPLINK NAS TRANSMPORT message.

In case of applying the procedure of FIG. 5 to an embodiment, if the location registration request message of the UE 100 is transmitted before the expiry of the timer of the RAN control entity 130, the RAN control entity 130 may perform the location registration of the UE by reusing the radio connection.

A description is made of the second problem to be solved by the present disclosure hereinafter.

The second problem has a background in which the UE 100 is interacting with two or more radio access points 110 and 115 as shown in FIG. 1. The UE 100 interacts primarily with the radio access point 110 and may change the radio access point interacting currently when the radio connection state with the radio access point 110 becomes lower than a predetermined level. The new radio access point primarily interacting with the UE 100, i.e. the target radio access point, may be the radio access point 115 which has interacted with the UE 100 secondarily before.

In the conventional handover procedure, any mechanism defined for reuse of the entire or a part of the radio connection between the UE 100 and the radio access point 115 interoperating secondarily with the UE 100 and thus there is not any difference between the handover to the radio access point 115 interacting secondarily with the UE 100 previously and the handover to the radio access point which has hand no interaction with the UE.

If the radio access point 110 interacting primarily with the UE 100 fails starting a handover of the UE in time, Radio Link Failure (RLF) or Handover Failure (HOF) may occur between the UE 100 and the radio access point 110 primarily interacting with the UE 100. The UE 100 undergoing the RLF or HOF with the primarily-interacting radio access point 110 may attempt radio connection reestablishment. The target to which the UE 100 is attempting the radio connection reestablishment may be the radio access point 115 interacting secondarily with the UE 100.

Even when the UE 100 is undergoing RLF or HOF with the primarily interacting radio access point 110, the radio connection with the secondarily interacting radio access point 115 may be maintained if the radio connection state between the secondarily interacting radio access point 115 and the UE 100 is good. In the conventional radio connection reestablishment procedure, however, the radio connection state between the UE and the secondarily interacting radio access point 115 is not considered. Furthermore, according to the conventional radio connection reestablishment procedure, the radio connection reestablishment may be performed after the connection between the secondarily interacting radio access point 115 and the UE 100 has been released.

Although there is further room of saving resource through reuse of radio resource in the case, as described above, where any radio access point 115 interacting secondarily with the UE 100 exists in the handover and radio connection reestablishment procedure of the UE, any mechanism for reflecting this is not defined in the conventional method.

Regarding the handover of the UE 100, the UE 100 or the radio access point 115 checks that the target radio access point 115 is the radio access point 115 which has been interacting secondarily before the handover and then completes the radio connection reconfiguration procedure by reusing the radio connection established already.

Regarding the radio connection reestablishment of the UE 100, if the radio connection reestablishment target is the radio access point 115 which has been interacting secondarily, the UE 100 or the radio access point 115 may complete the radio connection reestablishment procedure by reusing the radio connection present already.

In both the above two methods, the radio connection with the radio access point 115 interacting with secondarily with the UE is reused for a certain procedure, thereby saving power consumption.

Hereinafter, a description is made of the handover and radio connection reestablishment procedure of the UE 100 according to an embodiment of the present disclosure.

In the handover procedure of UE 100, the UE 100 or radio access point 115 checks that the target radio access point 115 is the radio access point which has been interacting secondarily with the UE 100 before handover, and completes the radio connection reconfiguration procedure by reusing the radio connection present already.

The UE 100 may check that the target radio access point 115 is the radio access point which has interacted secondarily with the UE 100 before the handover even with the legacy mechanism. However, the target radio access point 115 may not recognize that the UE 100 participated in the handover is the UE 100 which has interacted secondarily therewith.

Figure 6:
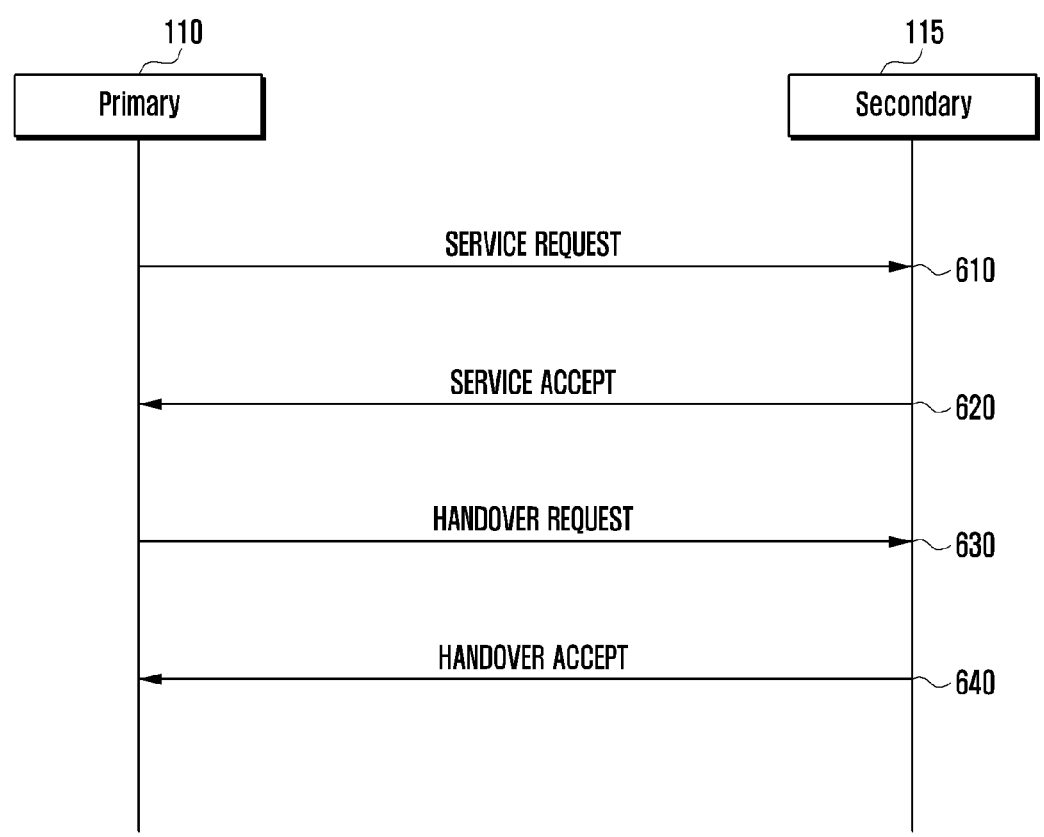
FIG. 6 is a signal flow diagram illustrating signal flows between a primary radio access point and secondary radio access points for recognizing that a UE in handover has interacting secondarily with a target radio access point according to an embodiment of the present disclosure.

FIG. 6 is a signal flow diagram illustrating signal flows between primary and secondary radio access points for recognizing that a UE in handover is interacting secondarily with a target radio access point according to an embodiment of the present disclosure.

Referring to FIG. 6, a radio access point 110 serving the UE 100 primarily, i.e. the primary radio access point 110, may transmit to a radio access point 115 a message requesting for serving the UE secondarily at operation 610. The transmitted request message may be any one of SCell ADDITION REQUEST, SENB ADDITION REQUEST or SCG ADDITION REQUEST message. The request message may include at least one of the identifier for use in identifying the UE 100 at the radio access point and the identifier for use in identifying the UE 100 at the radio access point 115. The included identifier may be any of C-RNTI and eNB UE X2AP ID.

The message transmitted at operation 610 may include other information in addition to the identifier to request successfully the radio access point 115 to serve the UE 100 secondarily. For example, the message may include at least one of sub-identifier of the radio access point 115, bearer information for service of the radio access point 115, access barring information of the UE 100, identifier of the RAN control entity 130 controlling the UE 100, identifier for use in identifying the UE at RAN control entity 130, security capability of the UE 100, AS security information, Aggregate Maximum Bit Rate (AMBR), and CSG membership state.

The sub-identifier of the radio access point 115 may be expressed in the form of E-UTRAN Cell Global Identifier (ECGI). If the radio access point 115 is an eNB, it may be necessary to transmit ECGI for cell-specific identification of the eNB. The bearer information which the radio access point 115 wants to serve may include at least one of bearer identifier, downlink transmission proposition, uplink GTP tunnel end point information and bearer QoS parameter. If the entity indicated by the sub-identifier of the radio access point 115 admits serving at least one of the bearers indicated by the bearer identifier, it may be necessary for the radio access point 115 to reserve the required resource.

The resource restriction information of the UE 100 may include the information on the resource which the UE 100 may. The resource use restriction information may be the Handover Restriction List (HRL). Since the HRL is the mobility information, other new information on the resource use may be introduced.

If the identifier of the RAN control entity 130 controlling the UE 100 is received, the radio access point 115 is capable of identifying the RAN control entity 130 using the identifier of the RAN control entity 130 controlling the UE 100 when it is necessary for interacting with the RAN control entity 130. Also, it is possible to identify the UE 100 with the identifier for use in identification of the UE 100 when interacting with the RAN control entity 130.

Referencing at least one of the security capabilities and AS security information, the radio access point 115 prepares for AS security configuration. More specifically, the radio access point 115 may perform AS security configuration including AS security key creation according to Security Capabilities and/or AS security information. At least one of the Security Capabilities and the AS security information may be transmitted only when request message contains bearer between the radio access point 115 and the core network 140 directly (not passing through the radio access point 110).

The radio access point 115 is capable of scheduling, such that the sum of the bit rates of specific bearers for serving the UE 100 does not exceed the AMBR of the UE 100. The specific bearers may denote all the bearers for the radio access bearer 115 to serve the UE or all of the data bearers for the UE 100 to serve the UE 100. In addition, the specific bearers may indicate non-Guaranteed Bit rate bearer which configured to communicate to core network 140 directly (not passing through the radio access point 110).

The CSG membership state denotes the result of the membership verification or access control which the UE 100 or the UE 100 and the radio access point 110 have performed to the radio access point 115. If it is determined that the CSG membership state is invalid, the radio access point 115 may transmit the correct CSG membership state or the radio access point 115 may reject the request at operation 620.

The radio access point 115, i.e. the secondary radio access point 115, may transmit to the primary radio access point 115 a message accepting the radio access point 115's secondary service to the UE 100 at operation 620. The accept message may be any one of SCell ADDITION ACKNOLEDGE, SENB ADDITION ACKNOWLEDGE or SCG ADDITION ACKNOWLEDGE. The accept message may include an identifier for the radio access point 115 to identify the UE 100. The identifier may be one of the C-RNTI and eNB UE X2AP. The accept message may include at least one of the information on the bearer which the radio access point 115 has accepted among the bearers requested by the radio access point 110 for service and the information on the bearers which the radio access point 115 has rejected.

The primary radio access point 110 may transmit to the secondary radio access point 115 a handover request message for the UE 100 at operation 630. The handover request message may be the HANDOVER REQUEST message. The HANDOVER REQEUST message may include the identifier received from the secondary radio access point 115 at operation 620.

The secondary radio access point 115 may transmit to the primary radio access point 110 a handover accept message at operation 640. The handover accept message may be a HANDOVER REQUEST ACKNOWLEDGE message. The handover accept message also may include the RRCConnectionReconfiguartion message, and the RRCConnectionReconfiguartion message may include the information on omitting at least one of Random Access procedure, uplink synchronization, and uplink allocation of the UE 100. This information may be expressed in the form of a bitmap.

The RRCConnectionReconfiguartion message received from the secondary radio access point 115 may be transmitted to the UE 100 and, as a consequence, the UE 100 may skip the random access procedure in the handover procedure to the secondary radio access point 115.

Figure 7:
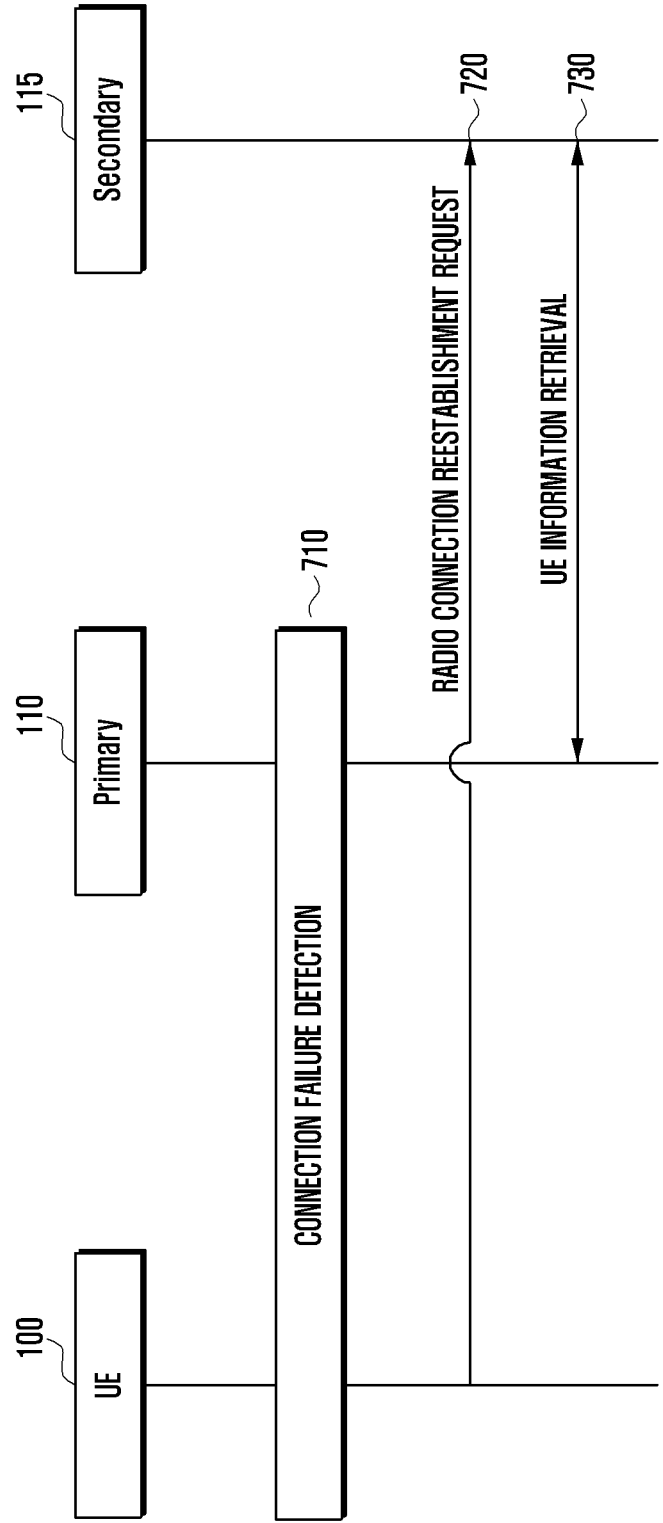
FIG. 7 is a signal flow diagram illustrating a radio connection establishment procedure by reusing a radio connection with a radio access point with which a UE has interacted secondarily according to an embodiment of the present disclosure.

FIG. 7 is a signal flow diagram illustrating a radio connection establishment procedure by reusing a radio connection with a radio access point with which a UE has interacted secondarily according to an embodiment of the present disclosure.

Referring to FIG. 7, a UE 100 detects RLF or HOF of the primary radio access point 110 at operation 710. The UE is capable of checking that a radio access point 115 to which the radio connection reestablishment request message is transmitted is the radio access point 115 with which the UE 100 has interacted secondarily, i.e. the secondary radio access point 115. In this case, the UE 100 is capable of releasing the connection with the other radio access points interacting secondarily with the exception of the secondary radio access point 115 at the initial stage of the radio connection reestablishment procedure.

The UE may transmit to the secondary radio access point 115 the radio connection reestablishment request message at operation 720. The radio connection reestablishment message may be the RRCConnectionReestablishmentRequest message. The UE 100 may skip the random access procedure before transmitting the radio connection reestablishment request message.

The radio connection reestablishment request message may include at least one of the identifier which the second radio access point 115 has used for identifying the UE 100, the identifier of the secondary radio access point 115, and shortMAC-I for the secondary radio access point.

The identifier which the secondary radio access point 115 has used for identifying the UE 100 may be C-RNTI. The identifier of the secondary radio access point 115 may be a Physical Cell Identity (PCI) or ECGI. The identifier which the secondary radio access point 115 has used for identifying the UE and the identifier of the secondary radio access point 115 may be paired in the request message.

The secondary radio access point 115 may retrieve the UE context using the identifiers of the UE and the secondary radio access point included in the request message. Also, the secondary radio access point 115 may use the shortMAC-I for the secondary radio access point to identify and inquire the UE 100.

The secondary radio access point 115 cooperates with the primary radio access point 110 to retrieve the UE information at operation 730. The secondary radio access point 115 may transmit to the primary radio access point 110 a UE information request message. If the request message is received, the primary radio access point 110 may provide the UE information. Examples of the UE information provided by the primary radio access point 110 may include UE radio access capability information, AS configuration, AS context, and Radio Resource Management (RRM) configuration. The radio access point 115 may store the received UE information and use the received UE information to the communication with the UE. Further, the radio access point 115 may also transmit the stored UE information to other entities while handover procedure caused by the mobility of UE 100.

In the above description of the embodiment, the radio access point 110 and the radio access point 115 are referred respectively the primary radio access point and the secondary radio access point. However, the radio access point 110 may refer the radio access point which was in the service to the UE prior to the connection failure and the radio access point 115 may refer the radio access point to which the UE requests the radio connection reestablishment after the connection failure in general.

Figure 8:
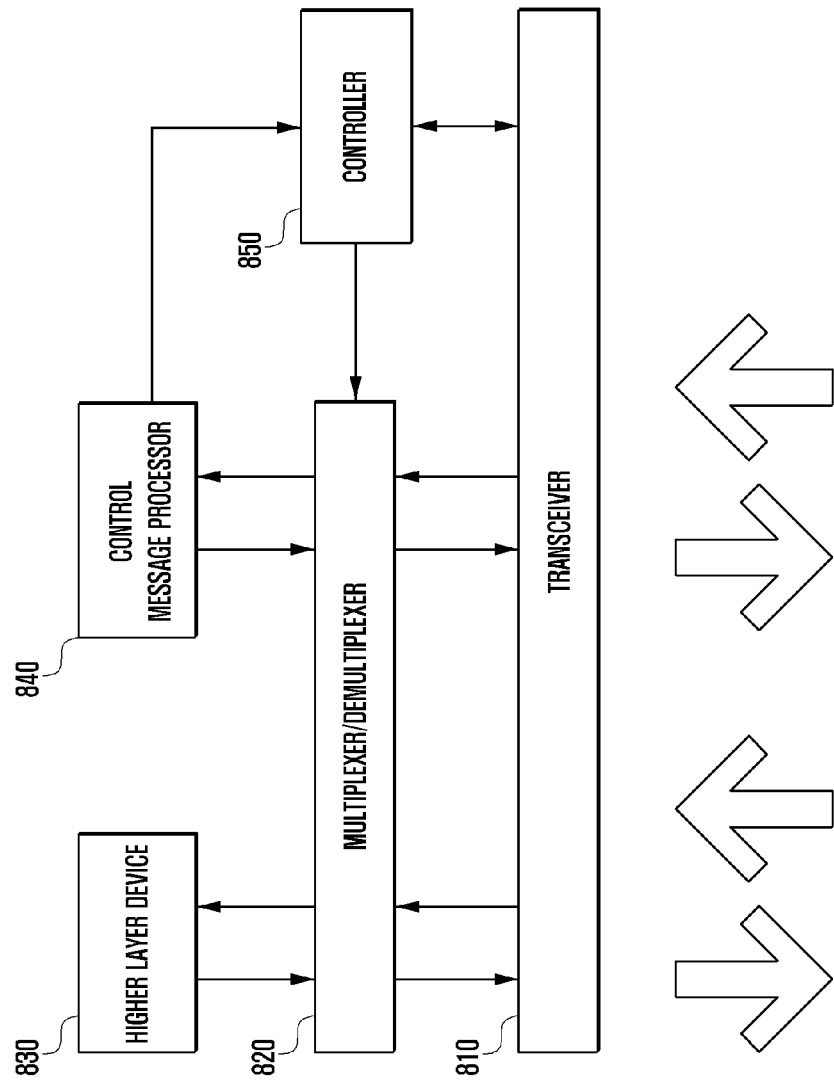
FIG. 8 is a block diagram illustrating a configuration of a UE according to an embodiment of the present disclosure.

FIG. 8 is a block diagram illustrating a configuration of a UE according to an embodiment of the present disclosure.

Referring to FIG. 8, the UE according to an embodiment of the present disclosure includes a transceiver 810, a multiplexer/demultiplexer 820, a higher layer device 830, a control message processor 840, and a controller 850.

The transceiver 810 receives data and control signals from the network, i.e. radio access point, through downlink channels and transmits data and control signals to the network through uplink channels.

The multiplexer/demultiplexer 820 multiplexes the data generated by the higher layer device 830 and the control message processor 840 and demultiplexes the data received by the transceiver 810 and transfers the demultiplexed data to the higher layer device 830 and/or the control message processor 840.

The control message processor 840 is an RRC layer device which processes the control message received from network to perform the necessary operation. The higher layer device 830 may be implemented per service to process the data generated by the user service and transmit the data to the multiplexer/demultiplexer 820 or process the data from the multiplexer/demultiplexer 820 and transmit the processed data to the service application on the higher layer.

The controller 850 controls the transceiver 810 and the multiplexer/demultiplexer 820 according to the information received through the transceiver 810. The controller 850 controls reduces the time for the UE to transmit new location registration request or improves the efficiency by reusing the radio connection according to an embodiment of the present disclosure.

Figure 9:
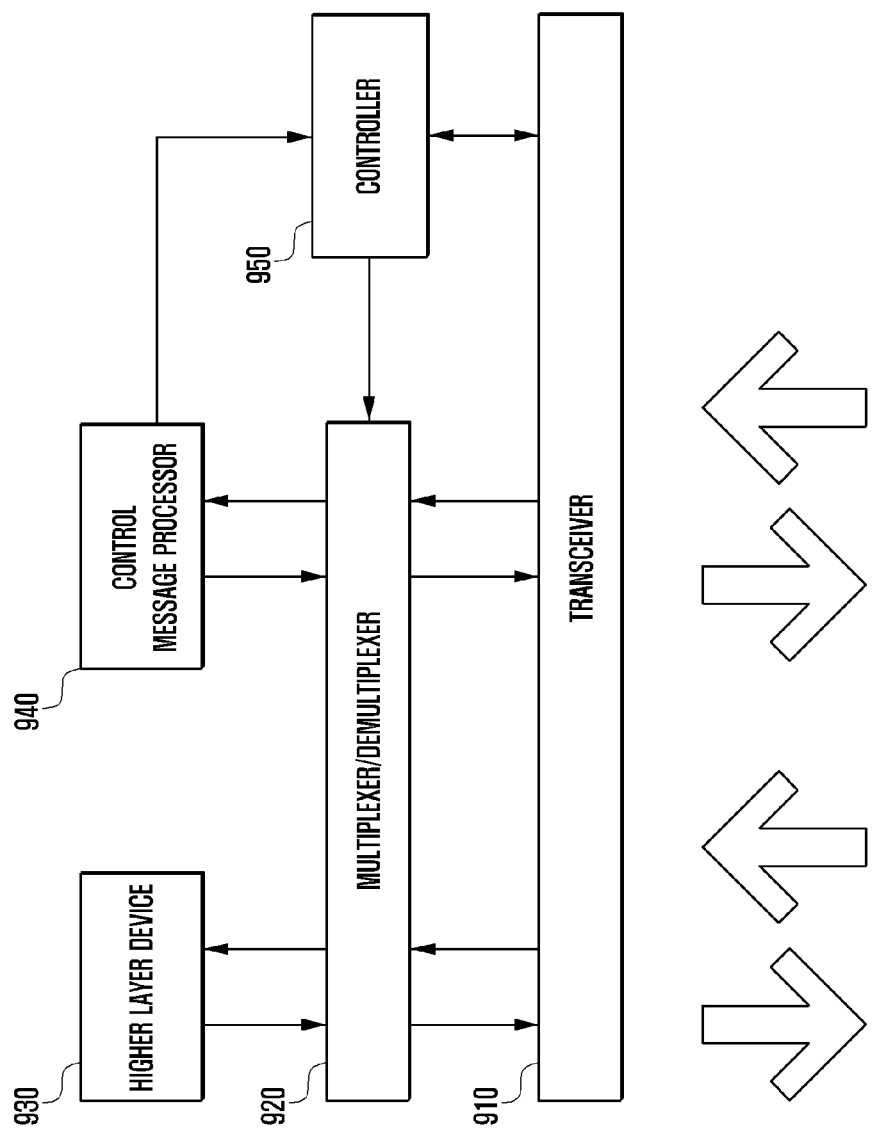
FIG. 9 is a block diagram illustrating a configuration of a radio access point (e.g. evolved Node B (eNB)) according to an embodiment of the present disclosure.

FIG. 9 is a block diagram illustrating a configuration of the radio access point (e.g. eNB) according to an embodiment of the present disclosure.

Referring to FIG. 9, the eNB includes a transceiver 910, a multiplexer/demultiplexer 920, a higher layer device 930, a control message processor 940, and a controller 950.

The transceiver 910 transmits data and control signals to the UE through downlink channels and receives data and control signals from the UE through uplink channels. The transceiver 910 may transmit and receive to and from another network entity connected through wired network, particularly a RAN control entity (e.g. MME) according to an embodiment of the present disclosure.

The multiplexer/demultiplexer 920 is responsible for multiplexing the data generated by the higher layer device 930 and/or the control message processor 940 and demultiplexing the data received by the transceiver 910 and transmitsthe demultiplexed data to the higher layer device 930 and/or the control message processor 940.

The control message processor 940 processes the control message transmitted by the UE to take a necessary action and generates a control message addressed to the UE to the low layer. The higher layer device 830 may be implemented per bearer and processes the data from the SGW or another eNB to generate RLC PDU to the multiplexer/demultiplexer 920 or processes the RLC PDU from the multiplexer/demultiplexer 920 to generate PDCP SDU to the SGW or another eNB.

The controller 950 controls the transceiver 910 and the multiplexer/demultiplexer 920 according to the information received through the transceiver 910. The controller 950 releases the radio connection of the UE as soon as possible to shorten the time required for the UE to transmit the new location registration request and maintain the radio connection for a predetermined duration to reuse the radio connection so as to improve the efficiency. Also, the controller 950 controls such that the UE reuses the radio connection with the secondary eNB in the handover and radio connection reestablishment procedure of the UE.

As described above, the location registration method and apparatus of the terminal in a mobile communication network according to the present disclosure is advantageous in efficient use of the radio resource in view of time reduction and resource saving.

In the above described various embodiments, all of the operations are to be performed or omitted selectively. In each embodiment, the operations may not be performed in the depicted order but in a changed order.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a master base station for adding a secondary base station in a communication system, the method comprising:
    transmitting a secondary base station addition request message including a first identifier allocated by the master base station for identifying a terminal by the master base station, security capabilities of the terminal and an aggregated maximum bit rate (AMBR) for the terminal to be used at the secondary base station to the secondary base station; and
    receiving a secondary base station addition acknowledge message including a second identifier allocated by the second base station for identifying the terminal by the secondary base station from the secondary base station, if secondary base station addition is admitted by the secondary base station,
    wherein the first identifier and the second identifier are used to support dual connectivity for the terminal.

2. The method of claim 1, wherein the secondary base station addition request message includes information on a bearer to be served.

3. The method of claim 2, wherein the fifth information on the bearer includes bearer identifier, information indicating if the bearer is proposed for forwarding, uplink general packet radio service (GPRS) tunneling protocol (GTP) tunnel end point information or bearer quality of service (QoS) parameter.

4. A method of a secondary base station in a communication system, the method comprising:
    receiving a secondary base station addition request message including a first identifier allocated by the master base station for identifying a terminal by the master base station, security capabilities of the terminal and an aggregated maximum bit rate (AMBR) for the terminal to be used at the secondary base station from a master base station; and transmitting a secondary base station addition acknowledge message including a second identifier allocated by the second base station for identifying the terminal by the secondary base station to the master base station, if secondary base station addition is admitted by the secondary base station, wherein the first identifier and the second identifier are used to support dual connectivity for the terminal.

5. The method of claim 4, wherein the secondary base station addition request message includes information on a bearer to be served.

6. The method of claim 5, wherein the information on the bearer includes bearer identifier, information indicating if the bearer is proposed for forwarding, uplink general packet radio service (GPRS) tunneling protocol (GTP) tunnel end point information or bearer quality of service (QoS) parameter.

7. The method of claim 5, further comprising:
scheduling bearers served to the terminal based on the AMBR.

8. A master base station for adding a secondary base station in a communication system, the method comprising:
a transceiver configured to transmit and receive a signal;
a controller configured to:
transmit a secondary base station addition request message including a first identifier allocated by the master base station for identifying a terminal by the master base station, security capabilities of the terminal and an aggregated maximum bit rate (AMBR) for the terminal to be used at the secondary base station to the secondary base station, and
receive a secondary base station addition acknowledge message including a second identifier allocated by the second base station for identifying the terminal by the secondary base station from the secondary base station, if secondary base station addition is admitted by the secondary base station,
wherein the first identifier and the second identifier are used to support dual connectivity for the terminal.

9. The master base station of claim 8, wherein the secondary base station addition request message includes information on a bearer to be served.

10. The master base station of claim 9, wherein the information on the bearer includes bearer identifier, information indicating if the bearer is proposed for forwarding, uplink general packet radio service (GPRS) tunneling protocol (GTP) tunnel end point information or bearer quality of service (QoS) parameter.

11. The master base station of claim 9, wherein the AMBR is used for scheduling bearers served to the terminal by the secondary base station.

12. A secondary base station in communication system, the secondary base station comprising:
a transceiver configured to transmit and receive a signal; and
a controller configured to:
receive a secondary base station addition request message including a first identifier allocated by the master base station for identifying a terminal by the master base station, security capabilities of the terminal and an aggregated maximum bit rate (AMBR) for the terminal to be used at the secondary base station from a master base station, and
transmit a secondary base station addition acknowledge message including a second identifier allocated by the second base station for identifying the terminal by the secondary base station to the master base station, if secondary base station addition is admitted by the secondary base station,
wherein the first identifier and the second identifier are used to support dual connectivity for the terminal.

13. The secondary base station of claim 12, wherein the secondary base station addition request message includes information on a bearer to be served.

14. The secondary base station of claim 13, wherein the information on the bearer includes bearer identifier, information indicating if the bearer is proposed for forwarding, uplink general packet radio service (GPRS) tunneling protocol (GTP) tunnel end point information or bearer quality of service (QoS) parameter.

15. The secondary base station of claim 13, wherein the controller is further configured to schedule bearers served to the terminal based on the AMBR.

16. The method of claim 2, wherein the AMBR is used for scheduling bearers served to the terminal by the secondary base station.

* * * * *